United States Patent
Davis et al.

[19]

[11] Patent Number: 5,989,421
[45] Date of Patent: Nov. 23, 1999

[54] BAG FILTER RIM SYSTEM

[75] Inventors: Scott J. Davis; John D. Vander Ark, Jr., both of Kalamazoo, Mich.

[73] Assignee: Delaware Capital Formation, Inc., Wilmington, Del.

[21] Appl. No.: 08/943,615

[22] Filed: Oct. 3, 1997

[51] Int. Cl.⁶ .................................................. B01D 29/13
[52] U.S. Cl. .......................... 210/232; 210/238; 210/451; 210/452; 210/477
[58] Field of Search ..................... 210/232, 238, 210/450, 451, 452, 473, 477; 55/378, 379, 502

[56] References Cited

U.S. PATENT DOCUMENTS

| | | | |
|---|---|---|---|
| 4,283,281 | 8/1981 | Cogan | 210/232 |
| 4,419,240 | 12/1983 | Rosaen | 210/444 |
| 4,490,253 | 12/1984 | Tafara | 210/238 |
| 4,775,469 | 10/1988 | Zimmerly | 210/237 |
| 4,818,398 | 4/1989 | Lott et al. | 210/238 |
| 5,186,828 | 2/1993 | Mankin | 210/232 |
| 5,222,488 | 6/1993 | Forsgren | 128/201.25 |
| 5,223,134 | 6/1993 | Riva | 210/232 |
| 5,290,441 | 3/1994 | Griffin et al. | 210/232 |
| 5,308,483 | 5/1994 | Sklar et al. | 210/232 |
| 5,358,638 | 10/1994 | Gershenson | 210/448 |
| 5,435,915 | 7/1995 | Connors, Jr. | 210/232 |
| 5,536,290 | 7/1996 | Stark et al. | 55/498 |
| 5,690,814 | 11/1997 | Holt | 210/94 |

*Primary Examiner*—Jay H. Woo
*Assistant Examiner*—Fred Prince
*Attorney, Agent, or Firm*—Flynn, Thiel, Boutell & Tanis, P.C.

[57] ABSTRACT

A filter assembly (10) with a filter housing (12) and a bag-type filter element (14). A collar (36) is disposed inside the housing below an opening (42) through which a process stream is introduced into the filter assembly. The filter element includes a filter bag (70) to which a sealing ring (72) is attached. The sealing ring is formed to define a channel (84) in which the collar is seated. The sealing ring also has a lip (86) that snap secures against a complementary stepped surface (60) formed around the collar. A gasket (85) attached to the sealing ring forms a liquid-tight barrier between the collar and the sealing ring. The collar is also formed with a boss (62). The sealing ring defines a alignment notch (88). In order to seal the filter element in place, boss (62) must seat in alignment notch (88); this ensures that when the filter element is secured in place, it is properly aligned with the other components of the filter assembly.

28 Claims, 7 Drawing Sheets

BAG FILTER RIM SYSTEM

FIELD OF THE INVENTION

This invention relates generally to filters used in industrial processes and, more particularly, to a rim system for facilitating the proper securement and alignment of a filter element, such as a bag-type filter element, in a housing in which it is employed.

BACKGROUND OF THE INVENTION

Filter assemblies are used in many industrial facilities to selectively remove material from liquid-state process streams. Filter assemblies are used to both remove undesirable contaminates from process streams and to remove desirable filtrates out of process streams. One type of filter that is employed in many industrial processes includes a bag-type filter element. As the name implies, the actual filter media of these filters is a flexible material such as woven polypropylene. The filter media is shaped to form an elongated bag having an open end and a closed end. The filter element is disposed in an elongated housing so that the open end is located adjacent the top of the housing. The process stream to be filtered is introduced into the top of housing so that it flows through the open end of the filter bag. The material is then trapped by the media and the filtered process stream flows out through the sides and closed bottom of the filter bag. The filtered process stream is discharged through an opening in the bottom of the filter housing.

U.S. Pat. Nos. 3,771,664 and 4,157,964, owned by the assignee of this application and incorporated herein by reference, disclose two known bag-type filter assemblies. More specifically, these patents disclose mechanisms for securing the top open end of the bag-type filter element into the top of the complementary housing. A satisfactory mechanism for securing a filter element in a housing must accomplish two tasks. First, it must secure the filter bag in the housing so that the top of the bag, referred to as the rim, is held in place. Secondly, the mechanism must provide a seal between the rim of the filter element and the surrounding, complementary component of the housing to which the rim is mated. This seal is important because, if it does not exist, the process stream, which is under pressure, can flow in the interstitial space around the rim. If this flow occurs, than at least a fraction of the process stream bypasses the filter and flows out of the filter assembly in the unfiltered state. It should thus be clear that for any bag-type filter element to function properly, a very strong seal needs to be formed around the open end of the bag.

The above patents disclose securement mechanisms, called seal compressors, that maintain good, liquid-tight seals around the open end of a bag-type filter element. A typical seal compressor includes a compressible seal that is located around the open end of the bag. Disks are employed to compress the seal against the housing in order to form a liquid-tight barrier.

While seal compressors work well for establishing a seal around the open end of a bag-type filter element, there is a disadvantage associated with their use. Specifically, a seal compressor is formed out of a large number of components. Providing and assembling these components together can significantly add to the overall cost of providing a filter assembly with a bag-type filter element. Also, a seal compressor must be partially disassembled and then reassembled whenever a filter assembly is serviced. Clearly, the time it takes to perform these processes adds to both the overall time it takes the technician to service the filter assembly and the time the assembly is out of service.

Also, it has recently become desirable to provide bag-type filter elements with handles that extend upwardly from the open end of the filter bag. Providing a filter bag with these handles facilitates the removal of the bag especially when it is weighted down with a large volume of removed material and any unfiltered liquid. However, if the handles are not properly aligned, they may be positioned in the path of process stream that is introduced into the filter assembly. If this occurs, the handles could be subjected to the substantial force that is presented by the pressure head of the process stream introduced into the filter assembly. Over time, there is a possibility that this force can weaken the connection between the handle and the component of the filter bag to which it is connected. If this connection is sufficiently weakened, the handle can be torn away from the filter bag while the bag is in use. Alternatively, the handle could separate from the filter bag as it is used to lift the filter bag from the filter assembly. In either case, the usefulness of the handle would be lost.

SUMMARY OF THE INVENTION

This invention is directed to filter assembly with a filter element, such as a bag-type filter element, that can be readily seated, secured and sealed in the filter assembly, and when so seated is properly aligned with the other elements of the filter assembly.

BRIEF DESCRIPTION OF THE DRAWINGS

The invention will be pointed out with particularity in the claims. The above and further advantages of the invention may be better understood by reference to the following detailed description, taken in conjunction with the following drawings, in which:

DETAILED DESCRIPTION

Figure 1:
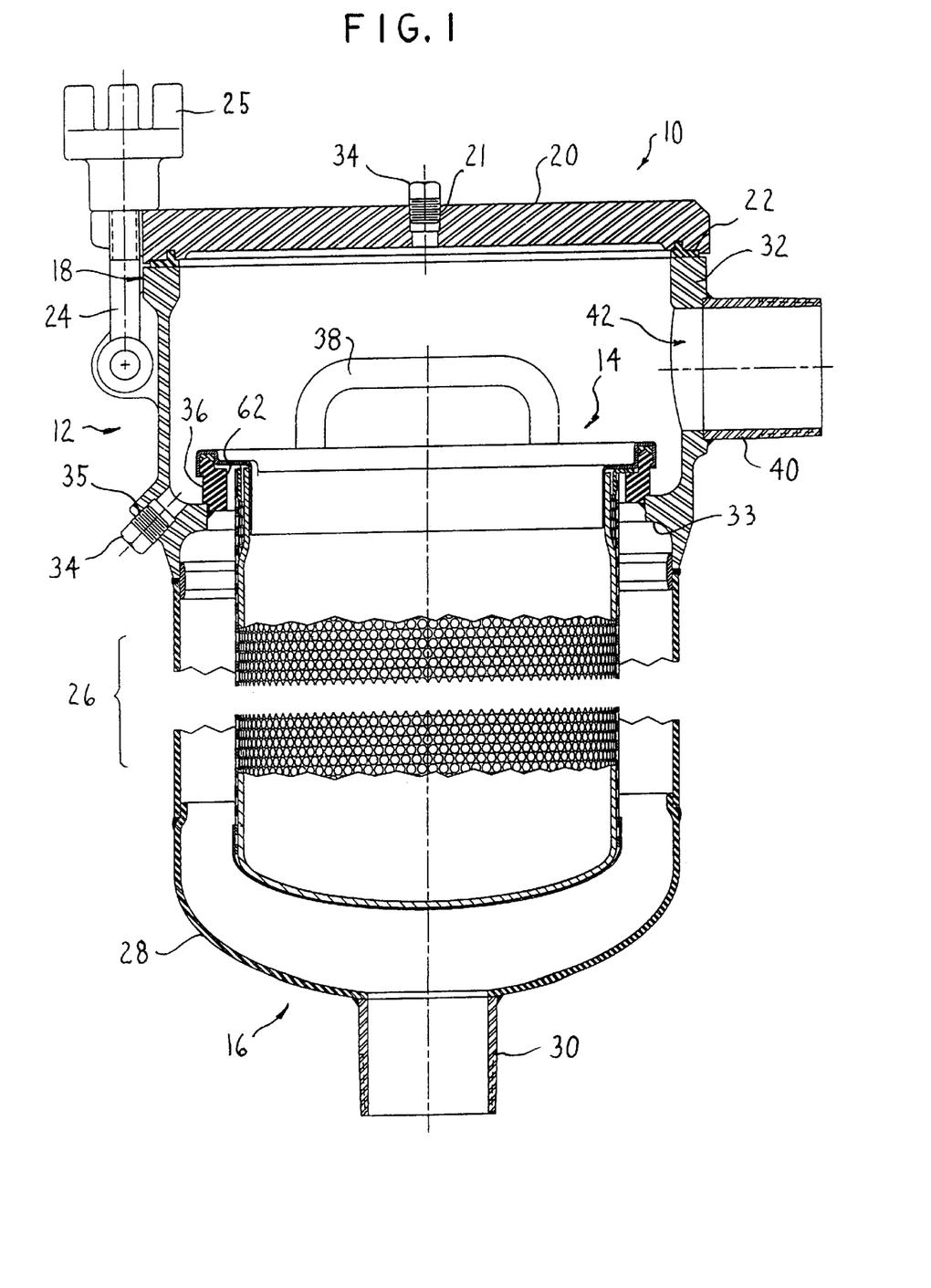
FIG. 1 is a cross sectional view of the filter assembly of this invention with a bag-type filter element.

FIG. 1 is a cross sectional view of a filter assembly 10 of this invention. Filter assembly 10 includes a housing 12 in which a bag-type filter element 14 is secured. The housing 10 has a generally cylindrical shape and has a closed bottom end 16 and an open top end 18. Top end 18 of the housing 12 is sealed by a removable cover 20. An annular gasket 22 is provided around the outer perimeter of the bottom surface of cover 20. When the cover 20 is seated over housing 12, gasket 22 abuts the top rim of the housing to form a liquid-tight seal between the housing and the cover. Clamp bolts 24 and complementary clamp nuts 25, one bolt-and-nut pair shown, removably secure cover 20 to housing 12. As is the practice with filter assemblies, the clamp bolts 24 are pivotally secured to the housing 12.

Housing 12 is formed out of three primary components. A sleeve-like main section 26 surrounds the body of the filter element 12. A base section 28 is attached to the bottom of main section 26. Base section 28 has an inwardly curved bottom that defines the bottom end 16 of the housing 12. An outlet pipe 30 is attached to the bottom of base section 28 to serve as the outlet conduit through which the process stream flows from the filter assembly 10.

A head piece 32, attached to main section 26 opposite bottom section 28, is the third primary component of filter element 12. Head piece 32 defines the open top end 18 of the housing 12 and is the component over which cover 20 is seated. The head piece 32 is also the component of the filter housing 12 to which the clamp bolts 24 are pivotally attached. The head piece 32 is formed to define an inwardly directed lip 33 that extends around the inside of the housing. An annular collar 36 is secured to lip 33 so as to extend upwardly from the lip 33. A first plug 34 is fitted in a threaded bore 35 formed in the side of head piece 32 above lip 33. A second plug 34 is seated in a threaded bore 21 formed in cover 20. Whenever it is necessary to insert a sensor in the filter assembly 10 or provide a conduit for venting purposes, the inside of the housing 12 can be accessed by unscrewing one or both of the plugs 34.

As will be explained hereinafter, filter element 14 is secured to collar 36. It will further be noted that head piece 32 extends upwardly, above collar 36 and above handles 38 that are part of the filter element 14. An inlet pipe 40, through which the process stream is introduced into the filter assembly 10, is connected to the portion of the head piece 32 located above collar 36. More particularly, the process stream from inlet pipe 40 enters the filter housing 12 through an opening 42 formed in head piece 32. Opening 42, it is noted, is located above collar 36.

Figure 2:
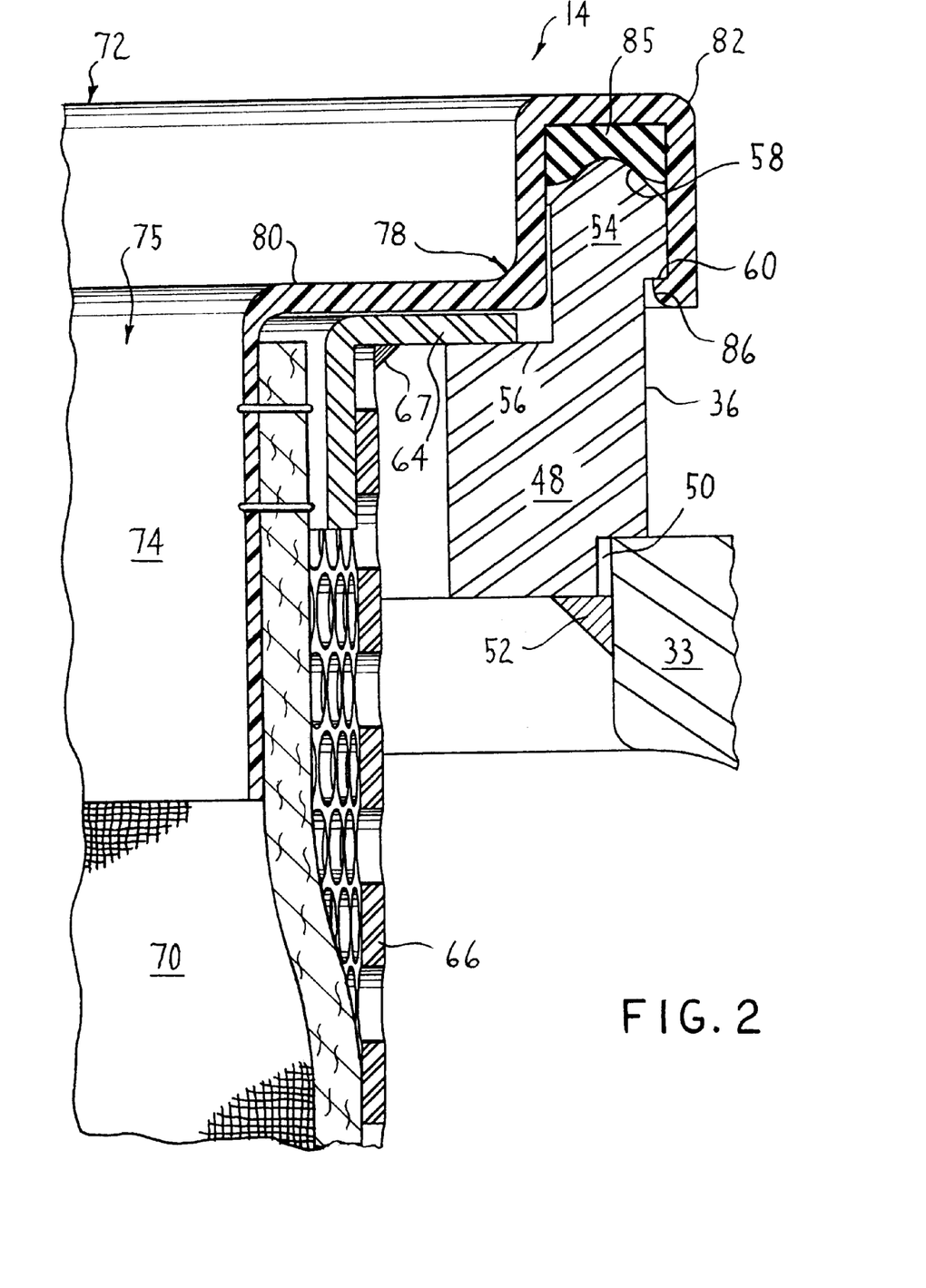
FIG. 2 is a detailed cross sectional view depicting the components of the filter element and how the filter element is sealing secured to the filter assembly.
Figure 3:
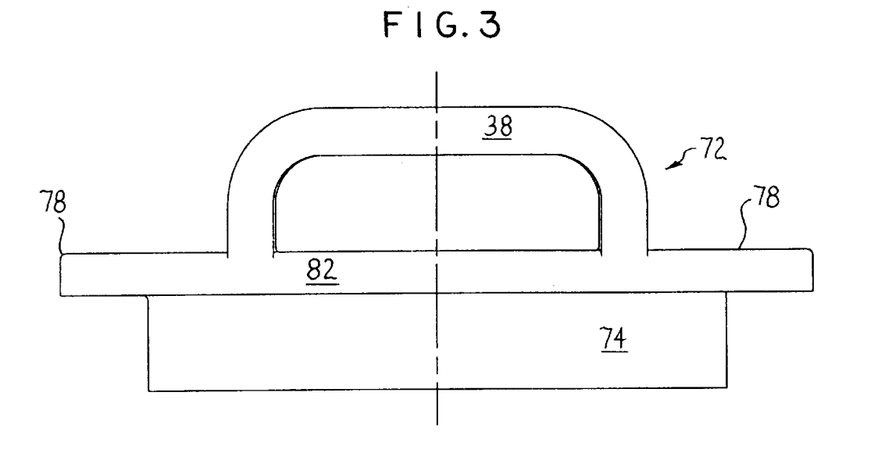
FIG. 3 is a view of one side of a sealing ring of the filter element showing one handle of the filter element.
Figure 4:
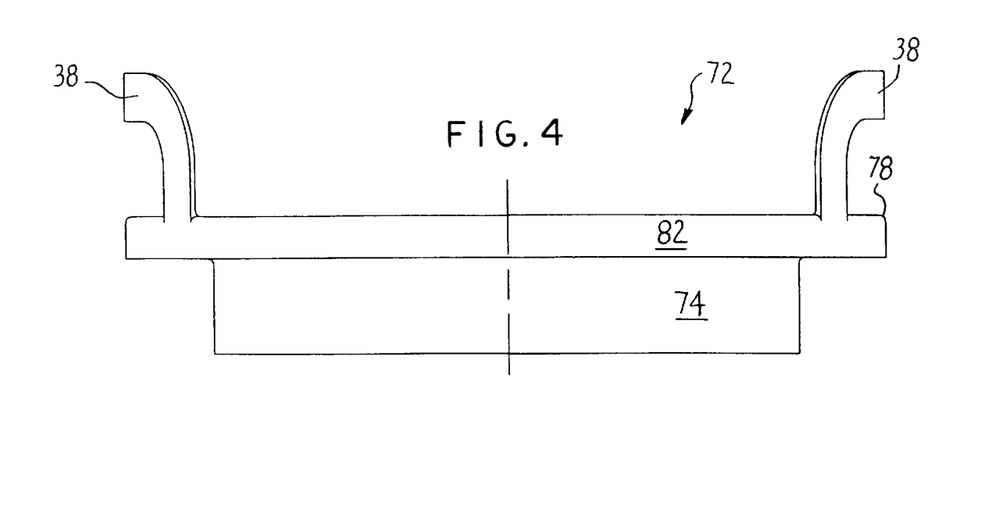
FIG. 4 is a view of a second side of the sealing ring of the filter element showing both handles of the filter element.
Figure 5:
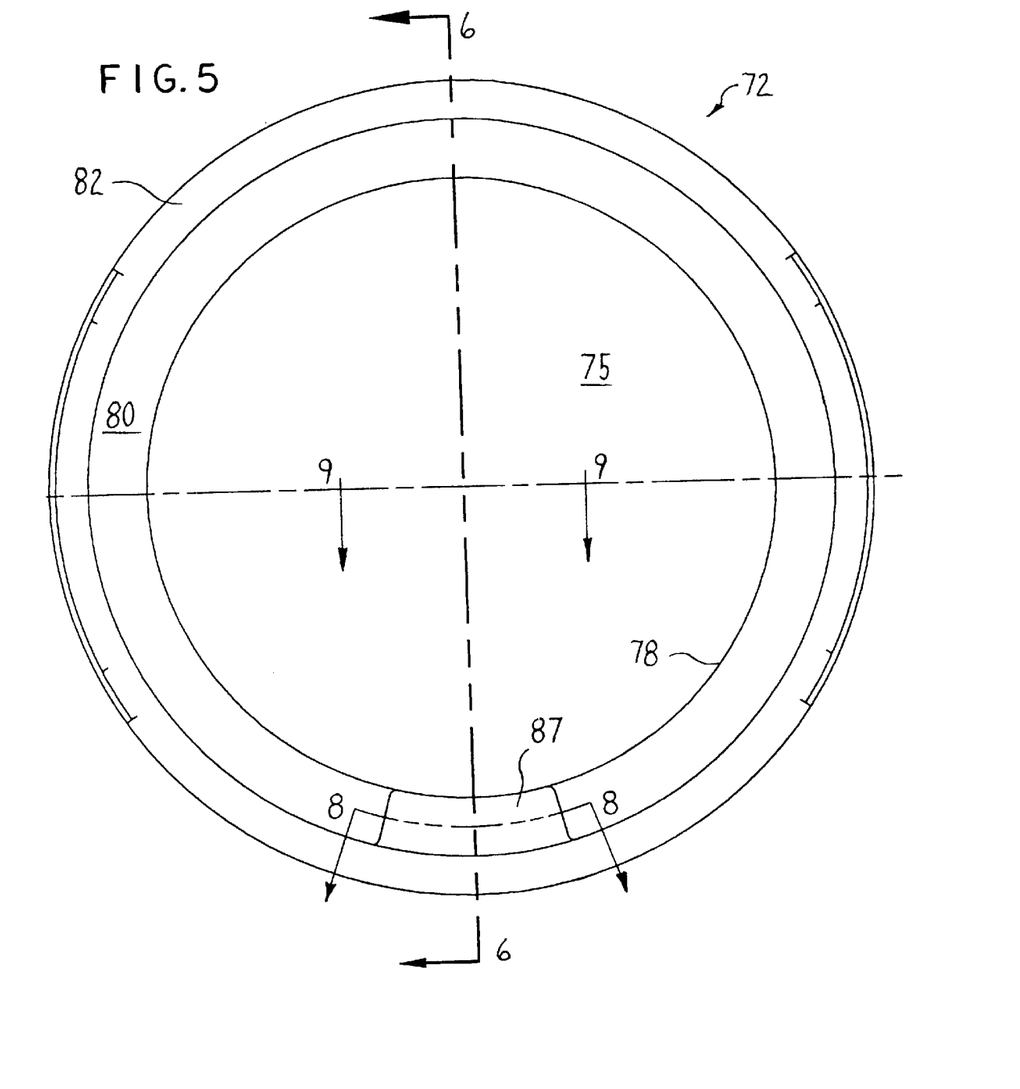
FIG. 5 is a top, plan, view of the sealing ring of the filter element.
Figure 6:
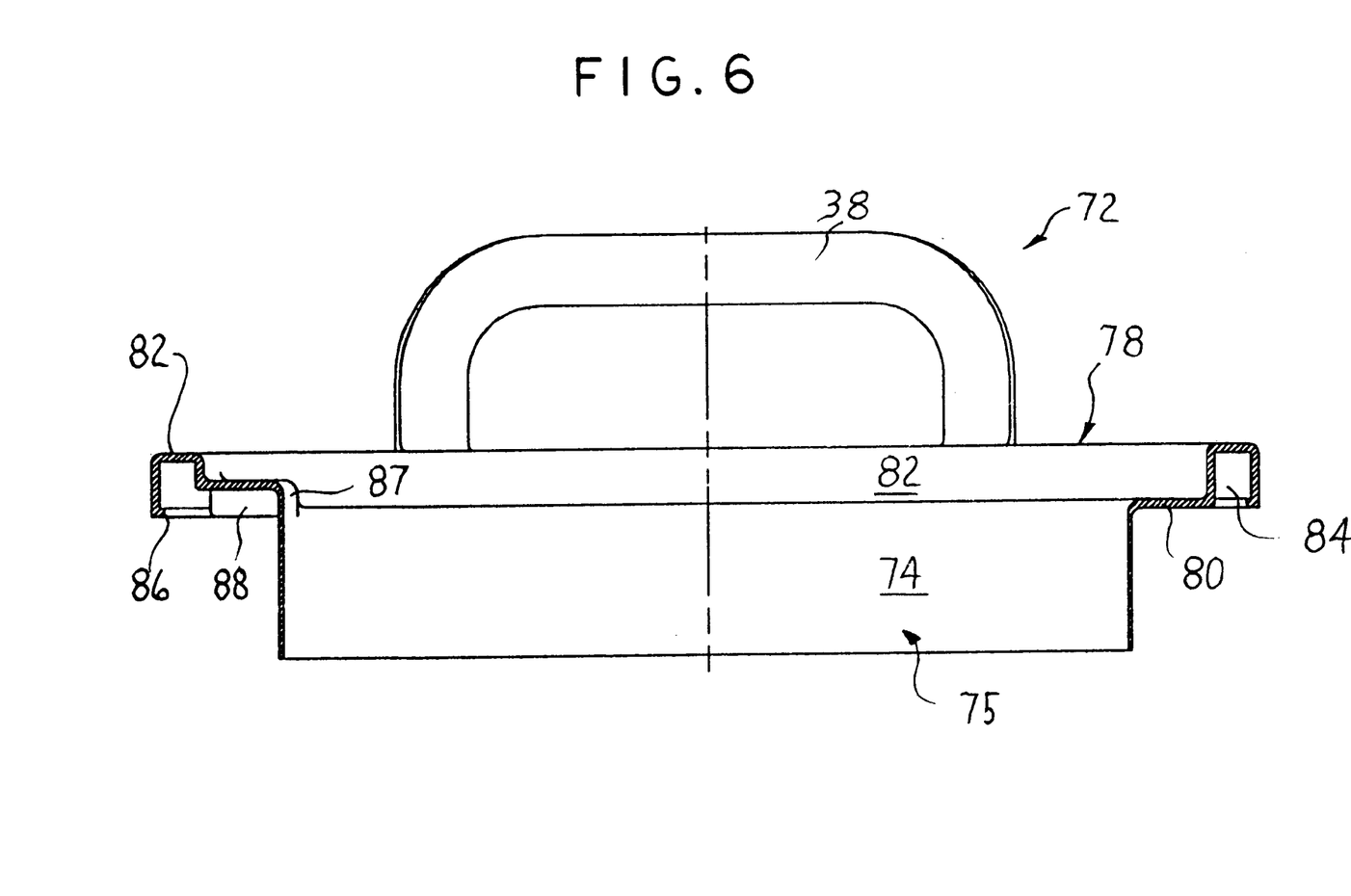
FIG. 6 is a cross sectional view of the sealing ring of the filter taken along line 6—6 of FIG. 5.
Figure 7:
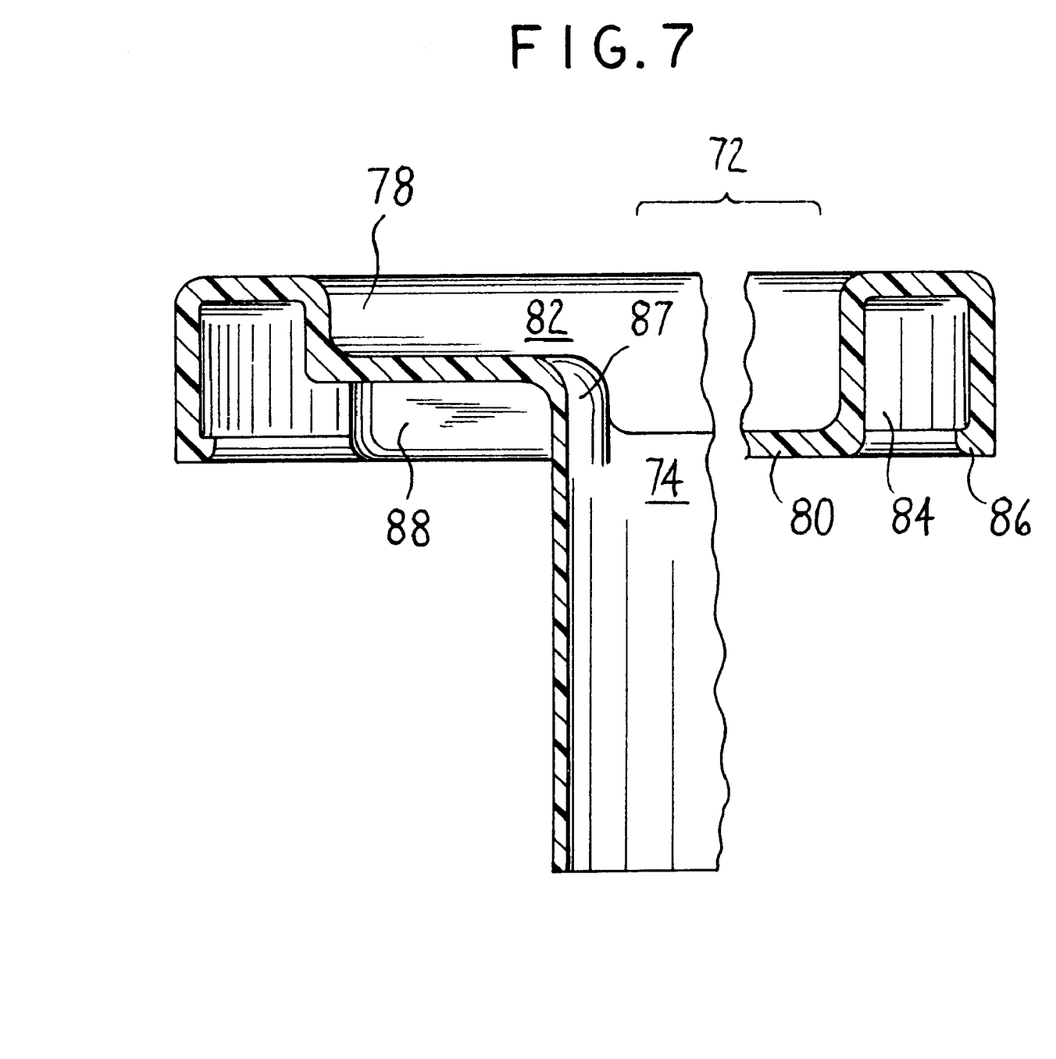
FIG. 7 is an enlarged cross sectional view of the portion of the sealing ring depicted in FIG. 5.
Figure 8:
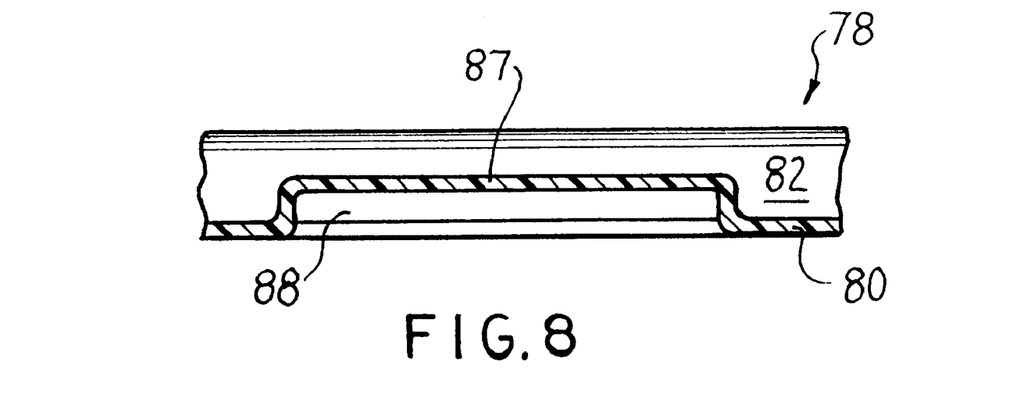
FIG. 8 is an arcuate cross sectional view of the portion of the sealing ring taken along line 8—8 of FIG. 5.
Figure 9:
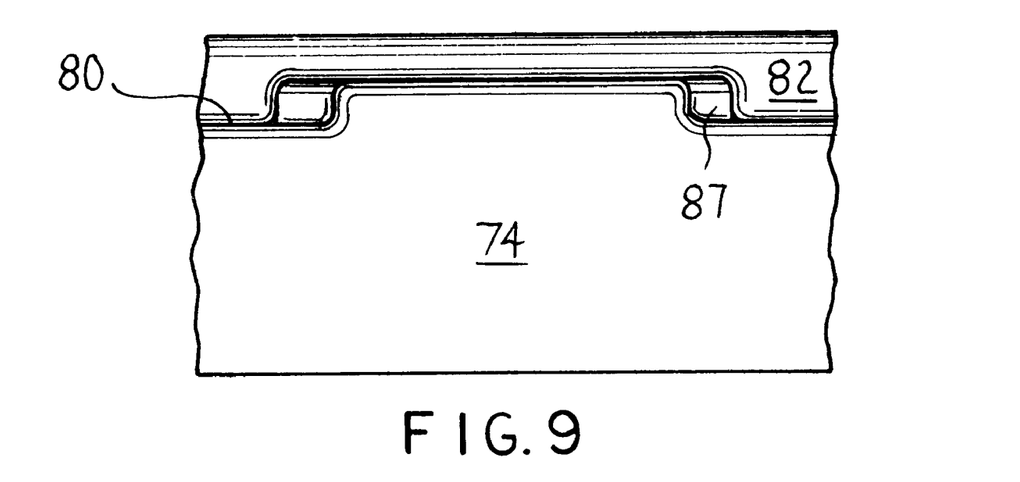
FIG. 9 is a cross sectional view of a portion of the sealing ring taken along line 9—9 of FIG. 5.

Collar 36, best seen by reference to FIG. 2, has a main body 48 with a generally rectangular cross sectional profile. It will be observed that the main body 48 of collar 36 is formed to define a rectangular notch 50 along its lower outer perimeter. When collar 36 is placed in filter housing 12, the forward portion of lip 33 seats in notch 50. Collar 36 is welded to lip 33 as represented by weld bead 52 adjacent notch 50. A head ring 54, integral with main body 48, extends upwardly from the outer half of the main body. Head ring 54 has a cross-sectional width less than that of the adjacent main body 48 so as to define a stepped surface 56 around the top of the main body 48. The head ring 54 is further formed to define a convexly curved crown 58 that functions as the top surface of the collar 36. Collar 36 is further shaped so that the outer surface of the upper portion of head ring 54 extends a slight distance outwardly beyond the portion of the head ring adjacent main body 48. The difference in diameters of the two outer surfaces of head ring 54 defines a stepped surface 60 that extends around the outer perimeter of collar 36.

As seen in FIG. 1, collar 36 is further formed to define a boss 62 that extends inwardly from the inner surface of head ring 48. Boss 62 extends over a portion of stepped surface 56. As will be described hereinafter, boss 62 facilitates the proper alignment of the filter element 14 in filter housing 12.

A bracket 64 sets on stepped surface 56. Bracket 64 extends around collar 36 and has an L-shaped cross-sectional profile. The horizontal portion of bracket 64 sets on stepped surface 56 and extends inwardly therefrom. The vertical portion of bracket 64 extends downwardly from the inner edge of the horizontal portion. A bag support basket 66 is secured to the vertical portion of bracket 64. Bag support basket 66 is formed from perforated metal and serves to prevent the outward expansion of the filter material of filter element 14. The bag support basket 66 has a circular cross sectional profile, an open top end and extends through housing main section 26 into housing base section 28. Bag support basket 66 has a closed bottom end located in housing base section 28. The bag support basket 66 is welded to the top of bracket 64 as represented by weld bead 67.

Filter element 14 includes a tube-like filter bag 70 to which a sealing ring 72 is attached. The filter bag 70 is formed of an appropriate cloth or synthetic filter media such as polypropylene, nylon or polyester. The sealing ring 72 is formed from a single piece of plastic that will not react with the material in the process stream being filtered. Suitable material from which the sealing ring 72 may be formed are polypropylene or nylon. The sealing ring 72 is formed to have a cylindrical base section 74. Base section 74 defines a center opening 75 that extends through sealing ring 72. The open end, the rim, of filter bag 70 is fitted over the outer surface of the base section 74. Filter bag 70 is secured to the base section 74 by sewing or plastic welding (e.g., ultrasonic welding or radio frequency welding.)

Sealing ring 72, now described by reference to FIGS. 3–7, is further formed to have an annular flange 78 that extends radially outwardly from base section 74. Flange 78 has an inner section 80 that is connected with and extends perpendicularly away from base section 74. The flange 78 further has an outer section 82 integral with inner section 80. Outer section 82 is a three-sided member that extends upwardly from the outer perimeter of inner section 80. The three sides of outer section 82 define an annular channel 84 that, in a gravity-oriented reference system, has a downwardly directed opening. More particularly, outer section 82 is dimensioned so that it will fit tightly over the head ring 54 of collar 36. An annular gasket 85 (FIG. 2) is fixedly secured to the undersurface of outer section 82 so as to be located in the top of channel 84. Gasket 85 is formed of material that, when compressed, forms a liquid-tight barrier. Foam, such as closed cell polypropylene, can be used to form gasket 85. It will further be noted that the outermost side member of outer section 82 of flange 78 is formed to have an inwardly directed lip 86 that extends back toward the center opening 75 of sealing ring 72. The sealing ring 72 is further formed so that lip 86 has an upwardly curved outer surface.

Handles 38 are integrally formed with sealing ring 72. The handles 38 extend upwardly from the outer perimeter of the outer section 82 of flange 78 and are diametrically opposed to each other. Handles 38 are further shaped to have a curved profile so that the handles subtend the same arc subtended by the underlying portion of flange 78.

It will observed from FIGS. 5–9 that the inner section 80 of sealing ring flange 78 is not planar around the complete circumference of the sealing ring 72. The inner section 80 is formed to have a single three-sided cup section 87 that extends upwardly from rest of the inner section 80. Cup section 87 is located between the handles 38. Cup section 87 extends all the way to the outer section 82 of flange 78. The bottom surfaces of cup section 87 define an alignment notch 88 that is integral with channel 84.

The filter assembly 10 of this invention is made ready for use by securing filter element 14 in filter housing 12. This is accomplished by first positioning filter bag 70 in bag support basket 66. In order to ensure the proper position of the filter element 14, sealing ring 72 is positioned so that alignment notch 88 is seated over boss 62. Once the filter bag 70 and sealing ring 72 are initially positioned, the sealing ring is secured to collar 36. This is accomplished by snap-fitting the outer section 82 of sealing ring 72 over collar head ring 54. This snap-securement is facilitated by the action that occurs when the curved outer surface of the sealing ring lip 86 of abuts the curved surface of the crown 58 of the collar 36. Specifically, when these two surfaces abut, the outermost side member of the sealing ring 82 is forced outwardly so that it extends over the outer perimeter of head ring 54. Once the lip 86 is pushed below head ring 54, the lip seats against stepped surface 60 of the collar 36.

This snap-securement of the filter element 14 compresses gasket 85 between the crown 58 of head ring 54 and the material forming sealing ring flange 78. The compression of gasket 85 causes the gasket to form a liquid-tight barrier that prevents material flow through the interstitial space in channel 84 between the head ring 54 and the flange 78. More specifically, this barrier is most secure along the line extending upwardly from the apex of the crown 58 to the opposed inner surface of the outer portion 82 of flange 72.

During servicing of the filter assembly 10, the filter element 14 is removed from the filter housing 12 by pulling upwardly and inwardly on one or both of the handles 38. This action causes the portions of annular lip 86 immediately below the handles 38 to pivot away from stepped surface 60 of collar 36. The continued upward pulling on the handles 38 serves to completely pull the lip 86 away from the companion stepped surface 60. Once lip 86 is freed from stepped surface 60, it is a relatively simple matter to pull the filter element 14 upwardly so that it can be completely removed from the filter housing 12.

The filter assembly 10 of this invention thus includes a convenient mechanism for both securing the filter element 14 to the filter housing and providing a liquid-tight barrier around the filter housing-filter element interface. Gasket 85 performs two functions. First, the gasket 85 forms a barrier along the filter housing-filter element interface. Secondly, owing to the natural tendency of the material forming the gasket 85 to expand, the gasket places an upward force on the sealing ring 72. This action also serves to establish a seal between the lip 86 and the adjacent stepped surface 60. This seal, which is in addition to the seal formed by gasket 85, serves to minimize the extent to which material is able to flow in the interface between these two components.

Still another feature of the filter assembly 10 of this invention is that all the components, including those which form the liquid-tight barrier, are integrally attached to either the filter housing 12 or the filter element 14. The need and costs associated with providing supplemental components to facilitate a liquid-tight seal between these two components are eliminated. The elimination of these components serve to reduce the time it takes for a technician to service the filter assembly 10 and the attendant time such servicing takes the filter assembly out of service. Also, in many environments in which the filter assembly 10 of this invention is employed, the technician can snap the filter element 14 in place and remove it from the filter housing with his/her hands. The elimination of the need to use tools to install and/or remove the filter element 14 in many situations serves to further minimize the amount of time it takes for the technician to service the filter assembly 10.

Moreover, in order for the filter element 12 to be sealed, alignment notch 88 must first be seated over boss 62. Thus, once the filter element 12 is sealed in place, it will be properly aligned with the other components of the filter assembly 10 of this invention. More particularly, it will be noted from FIG. 1 that the handles 38 will be positioned so that they are not directly in the path through which the process stream is discharged from opening 42. This positioning ensures that the pressure head of the process stream introduced into the filter assembly does not impinge on the handles 38. By positioning the handles 38 away from the full force of this pressure head, the possibility that the force of the pressure head could flex the handles 38 so as to result in the sealing ring 72 being lifted away from collar 36 is substantially eliminated. Moreover, since the handles 38 are not subjected to strong fluid forces, the likelihood of the handles' connections with the rest of the sealing ring 72 being significantly weakened is also avoided.

The above description has been limited to a specific embodiments of the invention. It will be apparent, however, that variations and modifications can be made to the invention with the attainment of some or all of the advantages thereof. For example, while the invention is primarily described as a bag-type filter assembly, it need not be so limited. Clearly, the filter bag may be replaced by other filter members include rigid filter members such as cartridge-type filters that are formed out of rigid, folded filter paper or other filter media. Typically, but not always, the filter media from which the filter member is formed is non-metallic filter media. Also, in some versions of the invention, it may not be necessary to concerned with the alignment of the filter element in the filter housing. In these versions of the invention, there may not be any need to provide the filter housing collar with the boss or the filter element sealing ring with an alignment notch.

Also, there may be some variation in the described components. For example, the head ring of the collar may be located more towards the center or inner perimeter of the associated base section. Similarly, there is no requirement that either the collar or the sealing ring that secures over the collar have the shapes as described. In other versions of the invention for example, it may be possible to eliminate the head ring of the collar or position it inwardly of the outer perimeter of the main body 48. Also, there is no need that the boss be integral with the head ring and the alignment notch positioned so as to be contiguous with channel 84. In some versions of the invention, the boss may simply extend away from any surface of the collar; In these versions of the invention the cup integral with the sealing ring that defines the complementary alignment notch would be appropriately positioned. It should likewise be understood that in other versions of the invention collar 36 may be provided with multiple alignment boss. In these versions of the invention, the sealing ring would have the requisite multiple alignment notches.

It should be recognized that other constructions of the components may be possible. For example, in some versions of the invention, the collar may be integrally formed with the other components of the filter housing. Similarly, the base section, the main section and the head piece of the filter housing 12 may be formed as a single component. Also, while the described filter element 14 has a circular cross-section profile, in other versions of the invention it may have different shapes. Also, in some versions of the invention handles 38 may merely be attached to the sealing ring instead of being integrally molded therewith. Therefore, it is the object of the appended claims to cover all such variations and modifications as come within the true spirit and scope of the invention.

The embodiments of the invention in which an exclusive property or privilege is claimed are defined as follows:

1. A filter assembly comprising:
   a filter housing, said filter housing having a top end, a bottom end opposite said top end, an inlet opening in said top end and an outlet opening in said bottom end;
   a collar secured in said filter housing so as to be located below said inlet opening, said collar having a top surface and an outer surface that defines an inwardly directed step; and
   a filter element, said filter element including:
      a sealing ring for removable attachment to said collar, said sealing ring defining a center opening and having an annular flange that extends around said center opening, and said annular flange has an outer member, said outer member having an inwardly directed lip, said flange defining a channel, wherein said flange is shaped so that, when said sealing ring is attached to said collar, said collar seats in the channel and said inwardly directed lip engages said inwardly directed step so as to hold filter element to said collar;
      a compressible gasket secured to an undersurface of said annular flange so as to be positioned in the channel wherein, when said sealing ring is attached to said collar and said inwardly directed lip engages the inwardly directed step, said gasket is compressed between the top surface of said collar and said flange; and
      a filter member attached to said sealing ring so as to subtend said center opening.

2. The filter assembly of claim 1, wherein: said collar is formed with a boss; and said flange of said sealing ring is formed with an alignment notch, so that when said sealing ring is attached to said collar, said boss seats in said alignment notch.

3. The filter assembly of claim 2, wherein said boss extends inwardly from said collar towards a center axis of said collar.

4. The filter assembly of claim 1, wherein:
   said collar is formed with a main section having a first cross sectional width and a head unit that extends above said main section, said head unit having a second cross sectional width that is less than said first cross section width, said head unit defining said top surface of said collar and having an outer surface that defines said inwardly directed step; and
   said flange of said sealing ring is shaped so that said channel receives said head unit of said collar.

5. The filter assembly of claim 4, wherein:
   said collar is formed with a boss that extends away from said head unit; and
   said flange of said sealing ring is formed with an alignment notch, so that when said sealing ring is positioned over said collar, said boss seats in said alignment notch.

6. The filter assembly of claim 5, wherein said head unit is located around an outer perimeter of said main section of said collar and said boss extends inwardly from said head unit.

7. A filter element for attachment to a collar internal to a filter housing, said filter element comprising:
   a sealing ring, said sealing ring having a base section that defines a center opening and a flange that extends outwardly completely around said base section, said flange being shaped to define a channel in which the collar is received and having an outer member with a lip positioned to engage a complementary surface of the collar;
   a compressible gasket secured to an undersurface of said flange so as to be located in the channel and extend completely around said flange and positioned to abut against the collar; and
   a filter member that is secured to said base section to subtend said center opening.

8. The filter element of claim 7, wherein said lip is directed towards said center opening.

9. The filter element of claim 8, wherein: said flange has an inner portion that is located adjacent said base section and an outer portion contiguous with said inner portion that is located distal to said base section, said channel being defined by said outer portion, and said lip is connected to said outer portion; and said inner portion of said flange is further formed to have a cup section that defines an alignment notch that is open along an undersurface of said flange.

10. The filter element of claim 7, wherein: said flange has an inner portion that is located adjacent said base section and an outer portion contiguous with said inner portion that is located distal to said base section, said channel being defined by said outer portion; and said inner portion of said flange is further formed to have a cup section that defines an alignment notch that is open along an undersurface of said flange.

11. The filter element of claim 10, wherein said cup section is positioned adjacent said outer section of said flange so that said alignment notch is integral with said channel.

12. The filter element of claim 7, wherein said filter member is formed from flexible material.

13. A filter element for attachment to a collar, said filter element including:
   a sealing ring, said sealing ring shaped to have: a base section that defines a center opening; a flange that extends around said base section, said flange having: an inner section located adjacent said base section; an outer section distal from said base section, said outer section being shaped to define a channel in which the collar is seated; and a lip integral with an outer perimeter of said flange that is inwardly directed so as to extend towards said channel; and a gasket secured to an undersurface of said flange so as to be located in said channel so that when the collar is seated in the channel, said gasket is compressed between the collar and said flange; and
   a filter bag secured to said base section so as to extend around said center opening.

14. The filter element of claim 13, wherein said inner section of said flange is shaped with a raised member so that said raised member forms an alignment notch along the undersurface of said flange.

15. The filter element of claim 14, wherein said raised member of said inner section of said flange is positioned so that said alignment notch is integral with said channel.

16. The filter element of claim 14, wherein said sealing ring is further formed with at least one handle that extends from said flange.

17. The filter element of claim 16, wherein said handle is integrally formed with said sealing ring.

18. A filter assembly including:
   a filter housing having ah elongated body with an inlet opening adjacent an upper end of said body and an outlet opening formed in a lower end of said body and a collar disposed in said body below said inlet opening, said collar having a top surface and an outer perimeter with an inwardly stepped surface;

a filter element configured to be removably secured to said collar, said filter element including: a sealing ring, said sealing ring having a base section positioned in said collar and that defines a center opening, a flange that extends outwardly from said base section, said flange being shaped to define a channel dimensioned to receive said collar including said collar top surface, a compressible gasket secured to an undersurface of said flange so as to be located in said channel between said top surface of said collar and said flange and a lip formed with said flange for engaging said inwardly stepped surface of said collar so as to hold said filter element to said collar; and a filter member secured to said base section so as to subtend said center opening wherein said sealing ring and said gasket are formed so that, when said sealing ring lip engages said collar, said gasket is compressed between said collar and said sealing ring.

19. The filter assembly of claim 18, wherein: said collar is provided with an outwardly directed boss; and said flange is formed to define an alignment notch in which said boss is received.

20. The filter assembly of claim 19, wherein said flange is formed so that said alignment notch is contiguous with said channel.

21. The filter assembly of claim 19, wherein said flange is formed to have a inner section located adjacent said base section and an outer section distal from said base section, said inner section forms said alignment notch and said outer section forms said channel.

22. The filter assembly of claim 18, wherein said filter element includes a handle attached to said sealing ring.

23. The filter assembly of claim 22, wherein said handle is integrally formed with said sealing ring.

24. The filter assembly of claim 1, wherein the channel of said sealing ring is partially defined by said outer member of said flange.

25. The filter assembly of claim 2, wherein: said filter element is provided with a handle that extends upwardly from said sealing ring and that does not project into space subtended by the center opening; said collar boss, said alignment notch and said handle are collectively positioned so that, when said sealing ring is attached to said collar, said handle is positioned to be spaced away from the inlet opening in said housing.

26. The filter element of claim 7, wherein the channel is partially defined by said outer member of said flange.

27. The filter assembly of claim 18, wherein said flange has an outer wall from which said lip extends and the channel is partially defined by said outer wall.

28. The filter assembly of claim 18, wherein said lip is formed to extend completely circumferentially around said collar.

* * * * *